US008905586B2

(12) United States Patent
O et al.

(10) Patent No.: US 8,905,586 B2
(45) Date of Patent: Dec. 9, 2014

(54) NATURAL LIGHTING APPARATUS AND HYBRID ILLUMINATION SYSTEM USING SAME

(75) Inventors: Se Dae O, Busan (KR); Ju Yoon Lee, Osan-si (KR); Kyoo Dong Song, Ansan-si (KR)

(73) Assignee: Se Dae O, Busan (KR)

( * ) Notice: Subject to any disclaimer, the term of this patent is extended or adjusted under 35 U.S.C. 154(b) by 191 days.

(21) Appl. No.: 13/378,746

(22) PCT Filed: Jun. 18, 2010

(86) PCT No.: PCT/KR2010/003946
§ 371 (c)(1),
(2), (4) Date: Dec. 16, 2011

(87) PCT Pub. No.: WO2010/147424
PCT Pub. Date: Dec. 23, 2010

(65) Prior Publication Data

US 2012/0091897 A1 Apr. 19, 2012

(30) Foreign Application Priority Data

Jun. 19, 2009 (KR) ........................ 10-2009-0055127

(51) Int. Cl.

| | |
|---|---|
| ***F21V 23/04*** | (2006.01) |
| ***H05B 35/00*** | (2006.01) |
| ***F21V 7/04*** | (2006.01) |
| ***G02B 17/00*** | (2006.01) |
| ***F21S 11/00*** | (2006.01) |
| ***F21V 7/06*** | (2006.01) |
| *F21V 8/00* | (2006.01) |
| *F21S 19/00* | (2006.01) |
| *F21Y 101/02* | (2006.01) |

(52) U.S. Cl.
CPC ............. *F21S 11/00* (2013.01); *F21V 23/0464* (2013.01); *F21V 2008/008* (2013.01); *F21S 19/00* (2013.01); *F21S 19/005* (2013.01); *F21V 7/06* (2013.01); *F21Y 2101/02* (2013.01)
USPC ................ 362/276; 362/1; 362/557; 359/598

(58) Field of Classification Search
CPC ....... F21S 11/002; F21S 11/005; F21S 19/00; F21S 19/005; F21Y 2101/02; F21V 7/06; F21V 23/0464; F21V 2008/008
USPC ......... 362/1, 2, 276, 345, 557, 576, 581, 802, 362/183, 228, 229; 359/597, 598, 591–596; 385/900; 136/246, 248; 52/28, 173.3, 52/200
See application file for complete search history.

(56) References Cited

U.S. PATENT DOCUMENTS

| | | | |
|---|---|---|---|
| 507,999 | A | 11/1893 | Davis |
| 1,254,520 | A | 1/1918 | MacDuff |

(Continued)

FOREIGN PATENT DOCUMENTS

| | | | |
|---|---|---|---|
| DE | 101 29 745 | A1 | 12/2001 |
| EP | 0 016 245 | A1 | 10/1979 |

(Continued)

OTHER PUBLICATIONS

International Search Report issued in PCT Application No. PCT/KR2010/003946 dated Feb. 22, 2011.

(Continued)

*Primary Examiner* — Alan Cariaso
(74) *Attorney, Agent, or Firm* — Ked & Associates LLP

(57) ABSTRACT

A natural lighting apparatus using sunlight is provided. The natural lighting apparatus includes a second light condensing device provided in a focal region of a first light condensing device to convert sunlight condensed in the focal region by the first light condensing device into straight parallel light rays through the second condensing device to provide sunlight having a high luminous flux to an indoor space. This natural lighting apparatus may be used together with an artificial illumination apparatus in a hybrid illumination system.

4 Claims, 12 Drawing Sheets

(56) References Cited

U.S. PATENT DOCUMENTS

| | | | | |
|---|---|---|---|---|
| 3,407,122 | A | 10/1968 | Dickinson, III | |
| 4,246,477 | A * | 1/1981 | Latter | 250/214 AL |
| 4,297,000 | A | 10/1981 | Fries | |
| 4,306,769 | A * | 12/1981 | Martinet | 359/597 |
| 4,425,905 | A * | 1/1984 | Mori | 126/578 |
| 4,720,170 | A | 1/1988 | Learn, Jr. | |
| 5,660,644 | A * | 8/1997 | Clemens | 136/245 |
| 5,716,442 | A * | 2/1998 | Fertig | 136/246 |
| 6,840,645 | B2 * | 1/2005 | Eisenman et al. | 362/2 |
| 7,339,739 | B1 | 3/2008 | Kinney et al. | |
| 2004/0118447 | A1 | 6/2004 | Muhs et al. | |

FOREIGN PATENT DOCUMENTS

| | | | |
|---|---|---|---|
| GB | 1 501 297 | A | 5/1975 |
| GB | 2 029 883 | A | 8/1979 |
| JP | 63-030801 | A | 2/1988 |
| JP | 06-037381 | | 2/1994 |
| JP | 09-097507 | | 4/1997 |
| JP | 2003-240356 | A | 8/2003 |
| JP | 2007-115417 | | 5/2007 |
| JP | 2007-188805 | A | 7/2007 |
| KR | 10-0332734 | | 4/2002 |
| KR | 10-2004-0086031 | | 10/2004 |
| KR | 10-2009-0021068 | | 2/2009 |
| WO | WO 93/10393 | A1 | 5/1993 |

OTHER PUBLICATIONS

European Search Report dated Oct. 14, 2013.

* cited by examiner

NATURAL LIGHTING APPARATUS AND HYBRID ILLUMINATION SYSTEM USING SAME

TECHNICAL FIELD

The present invention relates to a natural lighting apparatus using sunlight and, more specifically, to a natural lighting apparatus using sunlight, which includes a first light condensing member and a second light condensing member disposed in a focal region of the first light condensing member to convert sunlight condensed in the focal region through the first light condensing member into straight parallel light rays such as laser beams, thereby supplying sunlight at a high luminous flux indoor.

In addition, the present invention relates to a hybrid illumination system which uses the natural lighting apparatus together with artificial illumination and allows the natural lighting apparatus to be used as much as possible, thereby enabling energy saving.

The present invention may be applied to any type of natural lighting system, which is provided to a roof or an elevated side of a building or is implemented as an independent type lighting system such as a street lamp or a colonnade.

BACKGROUND ART

Currently developed or commercially available natural lighting systems (including sunlight condensing systems) are generally classified into stationary lighting systems using optical duct and sunlight condensing systems using a solar tracking lens (spherical lens or Fresnel lens).

A stationary lighting system using an optical duct has lower light condensing efficiency than a solar tracking type lighting system and is capable of lighting without significant influence of solar conditions (weather conditions). On the other hand, the solar tracking type lighting system enables lighting under conditions of clear sky or partially overcast sky and has high condensing efficiency.

It is difficult to determine superiority through simple comparison between these two kinds of lighting systems, and the stationary lighting systems are used for overall indoor illumination and the solar tracking type lighting systems are used for local indoor illumination in consideration of such merits and drawbacks.

In particular, the solar tracking type natural lighting systems are classified into a reflection mirror type (planar or curved reflector) and a lens type according to a principle of condensing light, or classified into a reflection mirror type and an optical fiber type according to a light transmission method.

The reflection mirror type enables transmission of sunlight over a long distance by a mirror without a separate light condensing unit, but requires a sufficient size of the mirror and a sufficient space for light transmission. The lens type has a limit to a light transmission distance (within 30 m) due to light transmission using optical fibers and low economic feasibility due to a limit of optical fibers.

Particularly, conventional natural lighting systems commonly suffer from spreading properties of condensed sunlight, which reduces luminous flux and makes light transmission difficult, so that significant optical loss occurs upon change of a direction during the light transmission, thereby making it difficult to achieve transmission of sunlight over a long distance.

DISCLOSURE

Technical Problem

The present invention is conceived to solve the problems of the related art and provides a natural lighting apparatus, which may convert condensed sunlight into straight parallel light rays of a high luminous flux such as a laser beam, thereby improving optical transmission efficiency.

The present invention also provides a hybrid illumination system which uses the natural lighting apparatus together with artificial illumination and allows the natural lighting apparatus to be used as much as possible, thereby enabling energy saving.

Technical Solution

In accordance with an aspect of the invention, a natural lighting apparatus using sunlight includes a first light condensing member reflecting incident sunlight to a focal region, and a second light condensing member disposed in the focal region of the first light condensing member to convert sunlight condensed in the focal region through the first light condensing member into straight parallel light rays.

The apparatus may further include a light transmission member transmitting the straight parallel light rays converted from sunlight through the second light condensing member.

The apparatus may further include a reflection member vertically or horizontally separated from the first light condensing member and reflecting sunlight to be vertically or horizontally incident on the first light condensing member.

The reflection member may include a solar position tracking portion tracking a solar position according to a solar altitude and a position adjusting portion controlling rotation and movement of the reflection member according to control of the solar position tracking portion.

The light transmission member may include a transmission unit for transmitting sunlight and a course changing unit for changing a course of sunlight, the transmission unit and the course changing unit being combined in the form of at least two blocks.

The transmission unit may include a cover serving as an outer shell, a reflective coating formed on an inner surface of the cover and subjected to mirror finishing, and a hollow transmitting portion which is formed inside the reflective coating and to which sunlight is transmitted.

The course changing unit may include a coupling portion to which the transmission unit is coupled, and a course changing portion constituted by a prism or a mirror for changing a course of sunlight.

The second light condensing member may have a size according to a diameter of the light transmission member.

The second light condensing member may have the same size as the diameter of the light transmission member.

The first light condensing member may be a concave mirror having a parabolic shape.

The second light condensing member may be a convex mirror having a parabolic shape.

In accordance with another aspect of the invention, a hybrid illumination system may include the natural lighting apparatus as described above, an artificial illumination mechanism which supplies artificial illumination via a lighting fixture, and a hybrid controller which controls natural illumination of the natural lighting apparatus and artificial illumination of the artificial illumination mechanism in a hybrid manner.

The artificial illumination mechanism may include at least one lighting fixture equipped to supply artificial illumination, a lighting fixture controller controlling the lighting fixture according to control of the hybrid controller, and a solar power generator supplying power to the lighting fixture.

The solar power generator may include a solar cell module accumulating thermal energy from sunlight, a converter converting the thermal energy accumulated in the solar cell module into electric energy, and a capacitor storing the electric energy converted from the thermal energy through the converter.

The hybrid controller may include a luminance sensor for measuring indoor luminance, a memory storing a minimum reference luminance for optimal luminance, and a hybrid control module controlling the artificial illumination mechanism to operate when a luminance measured by the luminance sensor is lower than the minimum reference luminance stored in the memory.

When the luminance measured by the luminance sensor is lower than the minimum reference luminance stored in the memory, the hybrid control module may set operation of the lighting fixture according to each luminance level and repeat a process of operating the lighting fixture at a higher luminance level than the measured luminance in order to maintain indoor luminance, until a luminance measured in operation of the lighting fixture at the lowest luminance level is greater than or equal to the minimum reference luminance.

when the luminance measured by the luminance sensor is lower than the minimum reference luminance stored in the memory, the hybrid control module sets operation of the lighting fixture according to each luminance level and repeats a process of operating the lighting fixture of the each luminance level by increasing stepwise from the lowest luminance level to higher luminance level in order to maintain indoor luminance, until a luminance measured in operation of the lighting fixture is greater than or equal to the minimum reference luminance.

Advantageous Effects

According to exemplary embodiments of the invention, the natural lighting apparatus may convert condensed sunlight into straight parallel light rays of a high luminous flux such as a laser beam, thereby improving light transmission efficiency and enabling transmission of sunlight without restriction as to transmission distance.

In addition, the hybrid illumination system according to embodiments of the invention employs the natural lighting apparatus together with artificial illumination and allows the natural lighting apparatus to be used as much as possible, thereby maximizing energy efficiency through reduction of energy consumption.

BRIEF DESCRIPTION OF THE DRAWINGS

FIG. 17 and FIG. 18 are flowcharts of a process of controlling an artificial illumination mechanism through a hybrid control module according to one exemplary embodiment, in which FIG. 17 is a flowchart of a process of controlling the artificial illumination mechanism when an indoor luminance is less than or equal to a minimum reference luminance, and FIG. 18 is a flowchart of a process of controlling the artificial illumination mechanism when an indoor luminance is greater than or equal to a maximum reference luminance.

BEST MODE

Next, exemplary embodiments of the present invention will be described with reference to the accompanying drawings.

Figure 1:
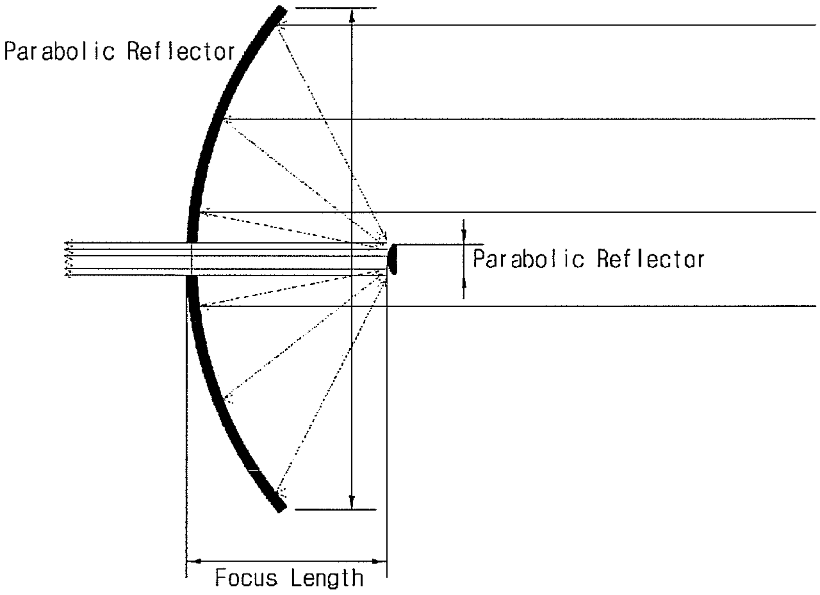
FIG. 1 is a conceptual view of a natural lighting apparatus according to one exemplary embodiment of the present invention.
Figure 2:
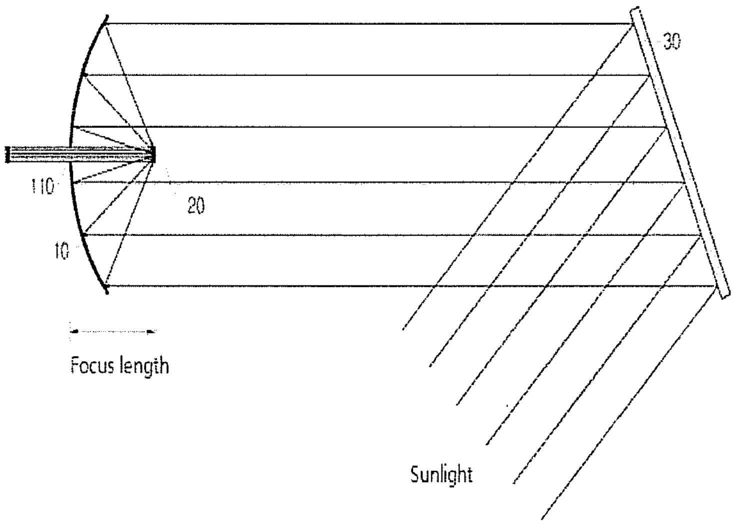
FIG. 2 is a conceptual view of the natural lighting apparatus further including a reflection member in FIG. 1.

FIG. 1 is a conceptual view of a natural lighting apparatus according to one exemplary embodiment, and FIG. 2 is a conceptual view of the natural lighting apparatus further including a reflection member in FIG. 1.

Referring to FIG. 1 and FIG. 2, the natural lighting apparatus according to the embodiment includes a first light condensing member 10 which reflects incident sunlight to a focal point, and a second light condensing member 20 which is disposed at or near the focal point of the first light condensing member and converts the sunlight condensed by the first light condensing member into straight parallel light rays of a high luminous flux. The apparatus may further include a reflection member 30 which tracks and reflects sunlight.

The first light condensing member 10 serves to condense sunlight reflected by the reflection member to the focal point.

The first light condensing member 10 may be a concave mirror having a parabolic shape and may be provided with a through-hole 110 at a center thereof vertically above the focal point to transmit the sunlight.

Figure 3:
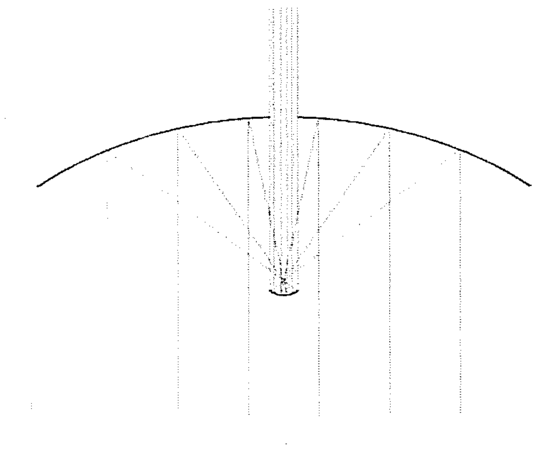
FIG. 3 to FIG. 5 are diagrams of sunlight transmission according to one exemplary embodiment of the present invention.
Figure 4:
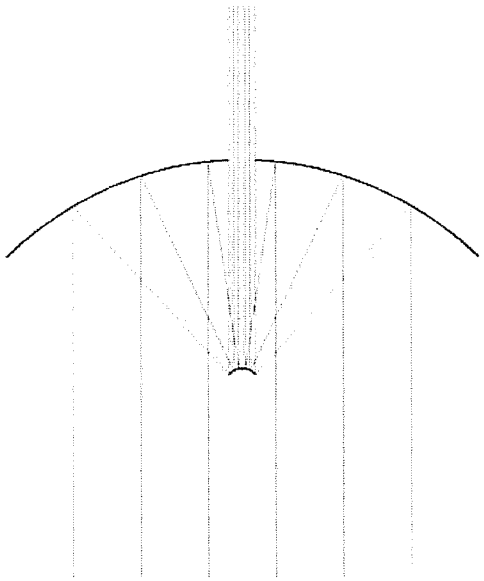
Figure 5:
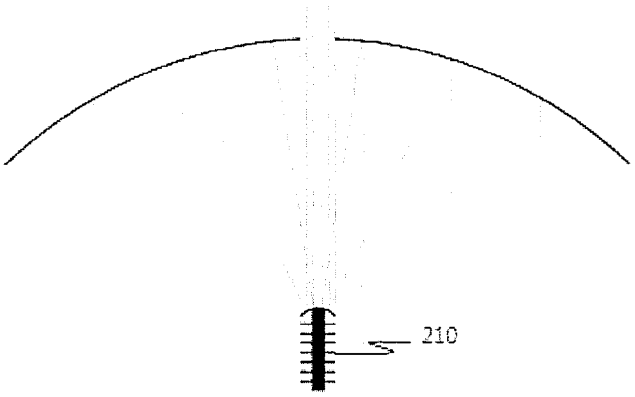

FIG. 3 to FIG. 5 are diagrams of sunlight transmission according to one exemplary embodiment of the present invention.

The second light condensing member 20 converts sunlight condensed to the focal point through the first light condensing member 10 into straight light of a high luminous flux and allows the condensed light to enter the through-hole 110.

The second light condensing member 20 may be a convex mirror having a parabolic shape.

When the second light condensing member 20 is a concave mirror as shown in FIG. 3, sunlight condensed by the first light condensing member passes through the focal point and is converted into parallel light rays through reflection by the concave mirror. Here, when light condensed in a space is collected upon the focal point, there can be not only problems such as generation of excessive heat and a fire, but also thermal load on the surface of the concave mirror, which affects reflection characteristics for providing parallel light rays. Thus, the second light condensing member is constituted by the convex mirror, as shown in FIG. 4.

The lighting apparatus may further include a heat sink 210 at the back side of the convex mirror to ensure more effective heat dissipation, as shown in FIG. 5.

Figure 6:
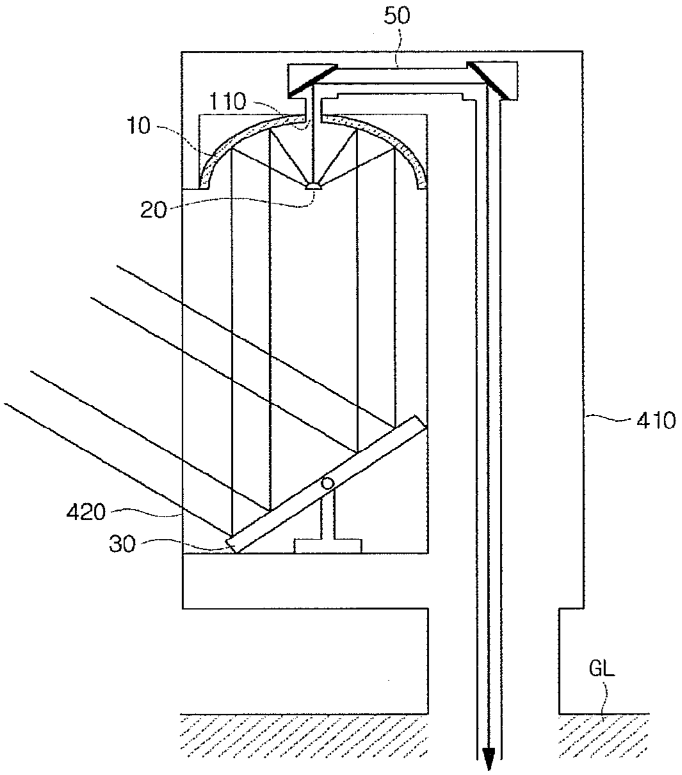
FIG. 6 is a cross-sectional view of the natural lighting apparatus according to the exemplary embodiment of the present invention.

FIG. 6 is a cross-sectional view of the natural lighting apparatus according to the exemplary embodiment of the present invention.

Referring to FIG. 6, sunlight converted into straight parallel light rays through the second light condensing member 20 may be incident on the through-hole 110 and enter indoors through the light transmission member 50 connected to the through-hole 110.

Here, the light transmission member 50 may be constituted by any member, such as an optical fiber or an optical duct, which can transmit sunlight.

Here, the light transmission member 50 may have a hollow shape in order to supply the converted parallel light rays without optical loss, so that light may be transmitted via air within the hollow member without any loss. Further, the light transmission member is provided at bent portions thereof with reflection mirrors or prisms to change a light transmission course.

The second light condensing member 20 has a cross-sectional area, which is less than or equal to the cross-sectional areas of the through-hole 110 and the light transmission member 50. The cross-sectional area of the second light condensing member may be determined according to a transmission distance of sunlight. Further, the cross-sectional areas of the through-hole 110 and the light transmission member 50 may be determined in proportion to the cross-sectional area of the second light condensing member.

For example, since a long transmission distance of sunlight requires a high luminous flux, the cross-sectional area of the second light condensing member decreases, and since a short transmission distance allows a low luminous flux, the cross-sectional area of the second light condensing member may increase.

Since the present invention is not limited by the light transmission distance so long as there is no obstruction such as floating matter or smoke in air in securing visibility, the present invention may be readily applied not only to general buildings, but also to buildings having complicated spatial arrangement or to underway facilities such as underway tunnels or subway stations.

Figure 7:
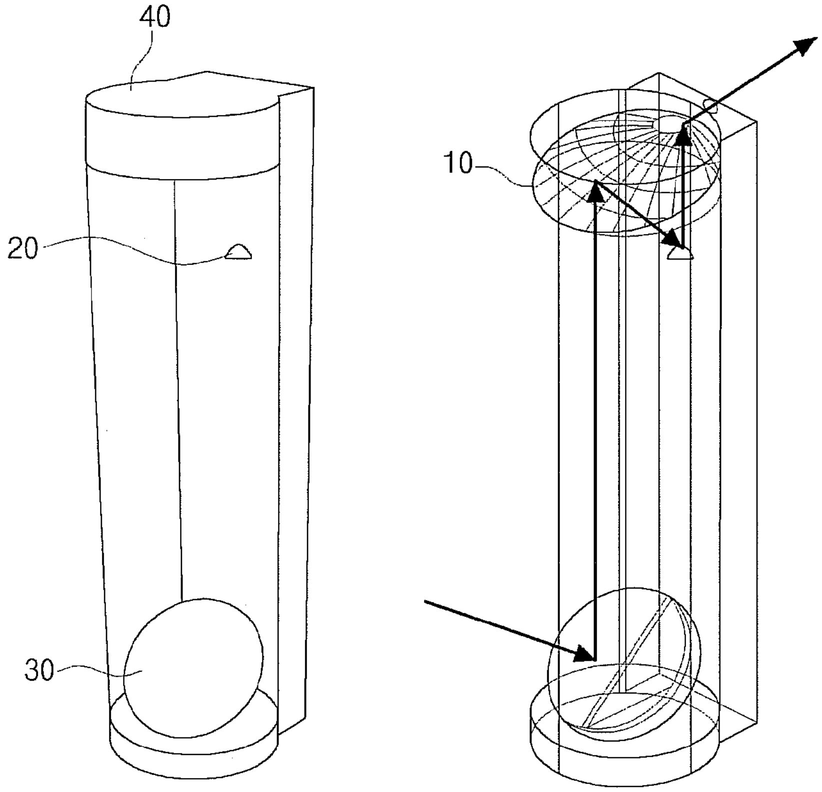
FIG. 7 to FIG. 9 are views of applications of the natural lighting system according to the present invention.
Figure 8:
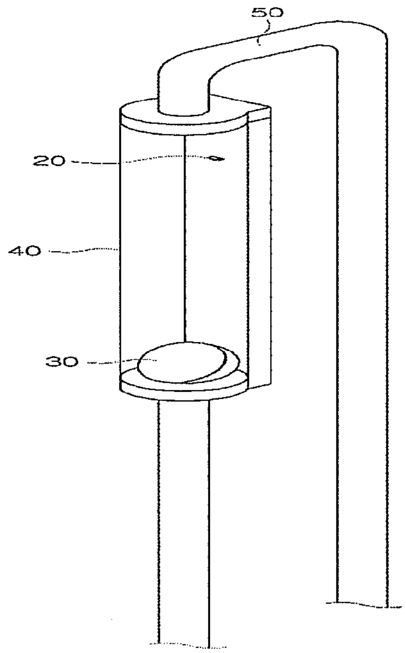
Figure 9:
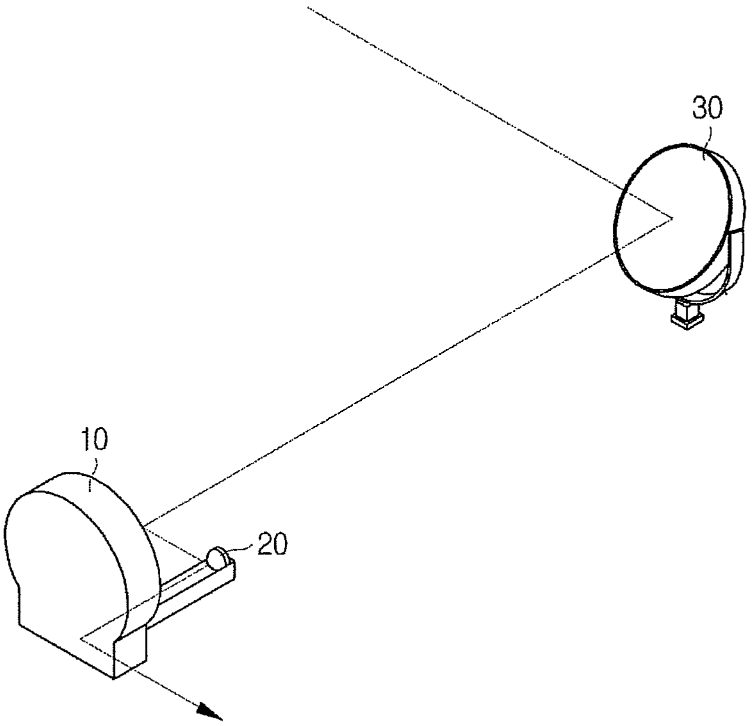

FIG. 7 to FIG. 9 are views of applications of the natural lighting system according to the present invention.

The natural lighting system according to the present invention may be implemented in a vertical type to be separately or integrally formed with an elevated side of a building, as shown in FIG. 7. Alternatively, the natural lighting system according to the present invention may be implemented in an independent type in the form of a pillar, a street lamp, a colonnade, and the like, as shown in FIG. 8, or may be implemented in a horizontal type to be installed on the roof of a building, as shown in FIG. 9.

Figure 10:
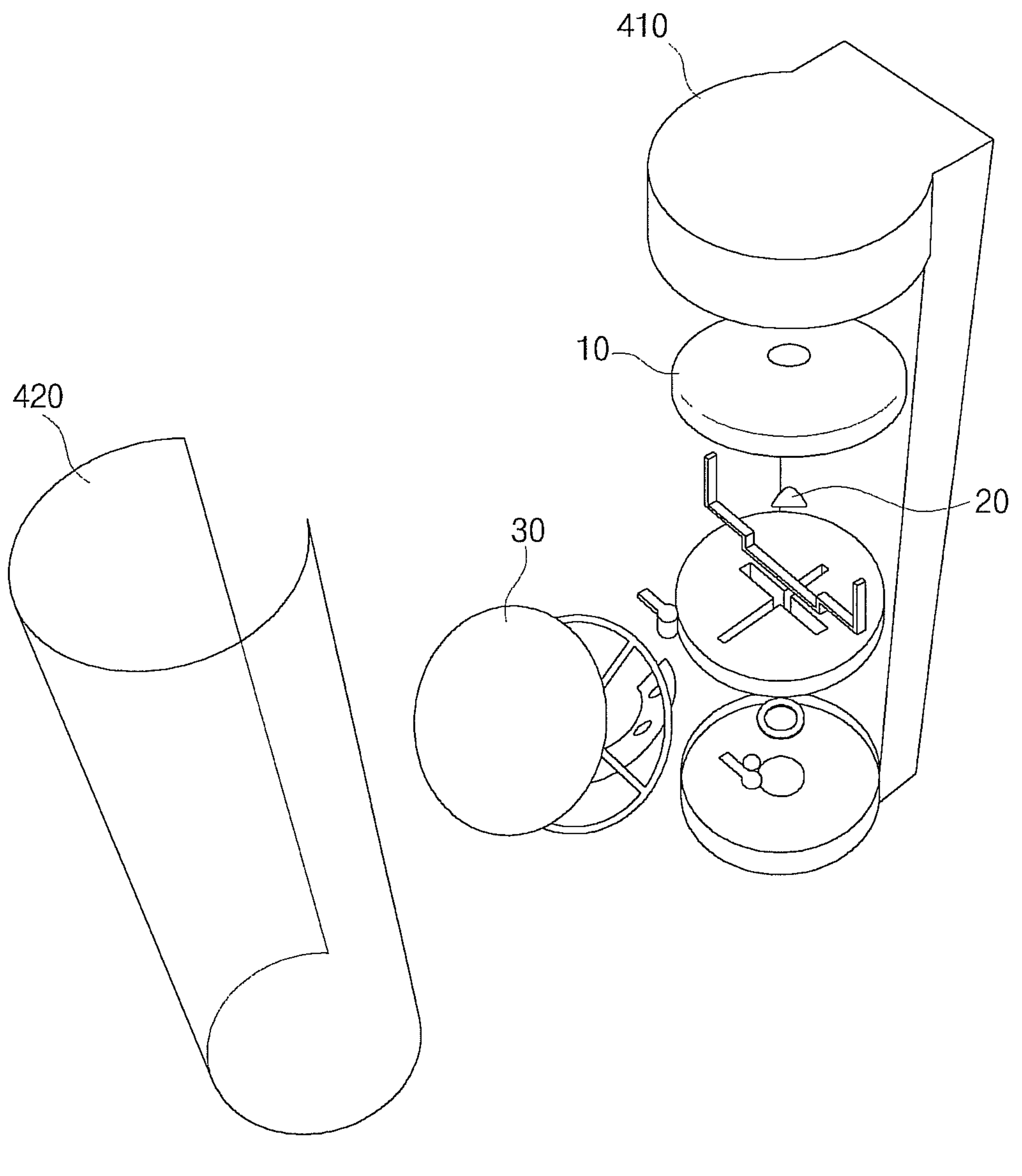
FIG. 10 is an exploded perspective view of a vertical type natural lighting system according to one exemplary embodiment of the present invention, which is installed on an elevated side of a building as shown in FIG. 6.

FIG. 10 is an exploded perspective view of a vertical type natural lighting system according to one exemplary embodiment of the invention, which is installed on an elevated side of a building, as shown in FIG. 7.

Referring to FIG. 10, the natural lighting system may include a frame member 40, which has a reflection member 30 mounted on a lower portion thereof, and first and second light condensing members 10, 20 received in an upper portion thereof.

In this embodiment, the frame member 40 may include a mounting portion 410, which receives the reflection member at a lower portion thereof and the first light condensing member at an upper portion thereof, and an incident portion 420, which is coupled to the mounting portion 410 and receives incident sunlight.

The incident portion 420 may be made of a transparent glass or plastic material to allow the sunlight to enter the reflection member therethrough.

The reflection member 30 mounted on the mounting portion 410 serves to reflect incident sunlight to transmit the sunlight to the first light condensing member 10 and may be configured to track the sun in order to transmit sunlight to the first light condensing member 10 as much as possible.

Thus, the reflection member 30 may include a reflecting portion which reflects sunlight, a rotating portion which rotates the reflecting portion, and a controller which controls rotation of the rotating portion which tracks sunlight.

The function of tracking sunlight according to a solar position is apparent to those skilled in the art and a detailed description thereof will thus be omitted herein.

The reflecting portion may be formed of any material which can reflect sunlight without optical loss and be implemented in the form of a reflection mirror or a reflection plate.

Figure 11:
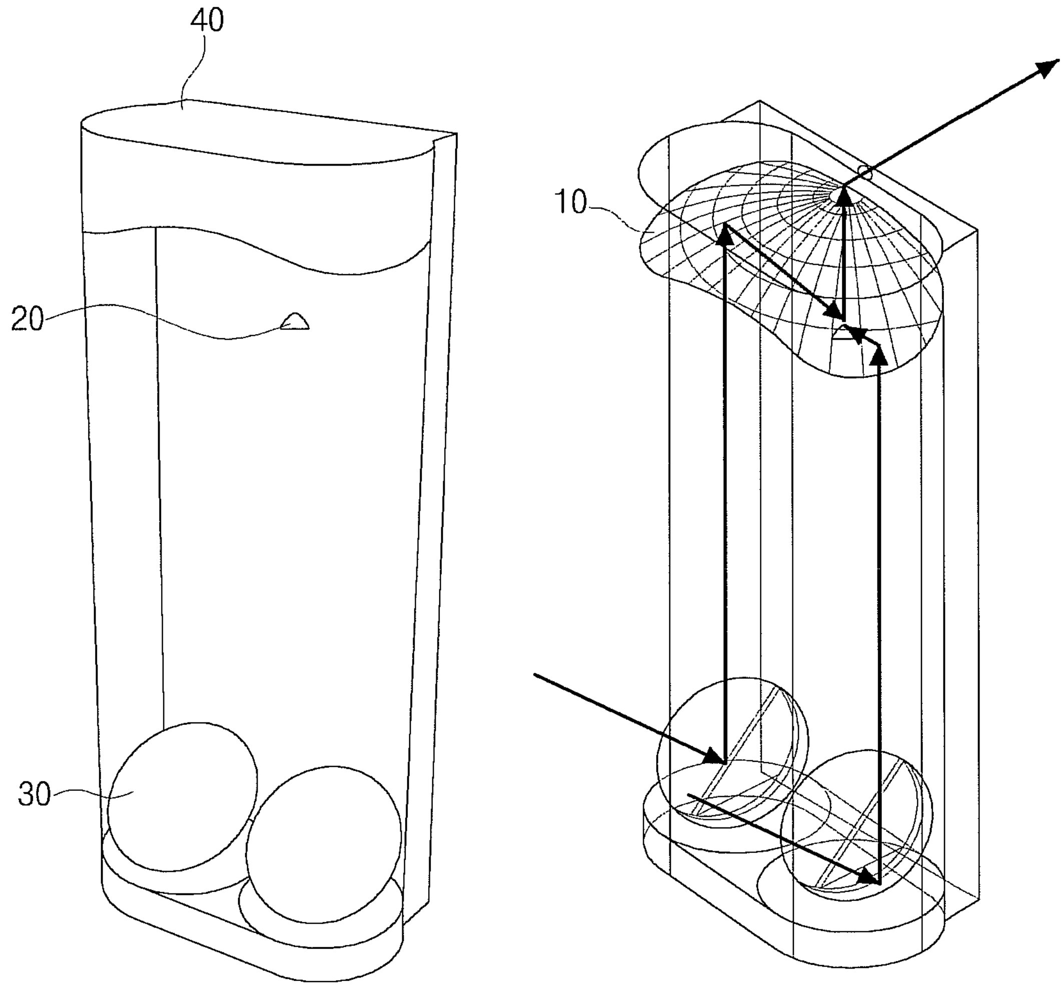
FIG. 11 is a view of the natural lighting system according to the exemplary embodiment of the present invention, which includes two first light condensing members and two reflection members as shown in FIG. 10.

In order to deliver as much sunlight as possible, the natural lighting apparatus may include at least two reflection members 30 and at least two first light condensing members 10, as shown in FIG. 11.

Since the second light condensing member 20 is formed in the focal region of the first light condensing member, the second light condensing member 20 may be separated from a side surface of the mounting portion 410 and may be attached to an inner surface of the mounting portion 410.

If the second light condensing member 20 is separated from the inner surface of the mounting portion, the lighting apparatus may further include a transparent support member (not shown) for supporting the second light condensing member 20. Here, the support member may extend from the side surface of the mounting portion or extend from the through-hole of the first light condensing member.

Further, if the second light condensing member 20 is mounted on the side surface of the mounting portion, the parabolic surface of the first light condensing member 10 may be adjusted in size and location such that the focal region of the first light condensing member 10 is located on the side surface of the mounting portion.

Further, the light transmission member 50 connected to the through-hole 110 of the first light condensing member may be coupled to the mounting portion to extend to an indoor side.

Figure 12:
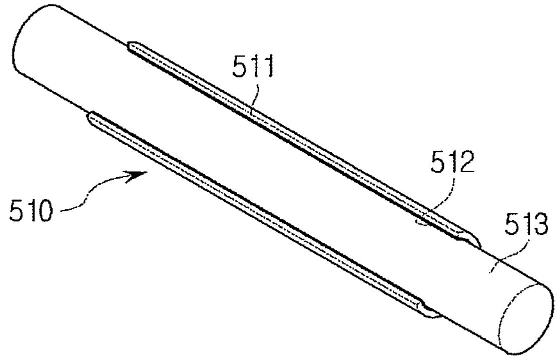
FIG. 12 is a perspective view of a light transmission member according to one exemplary embodiment of the present invention.
Figure 13:
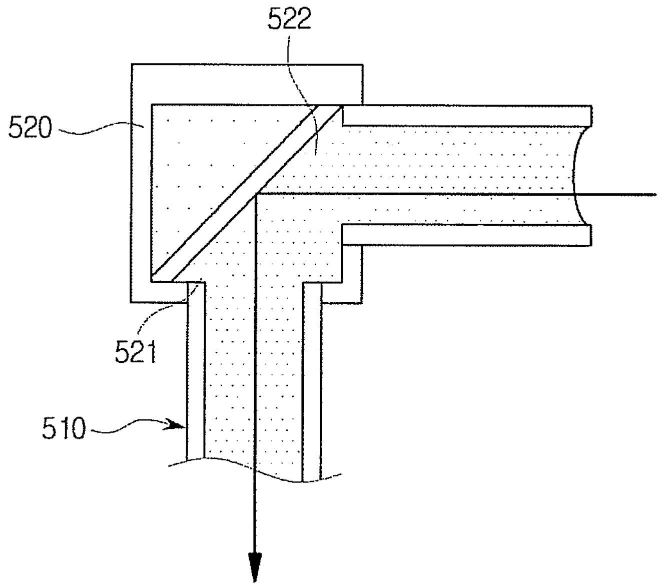
FIG. 13 is a cross-sectional view of the light transmission member.
Figure 14:
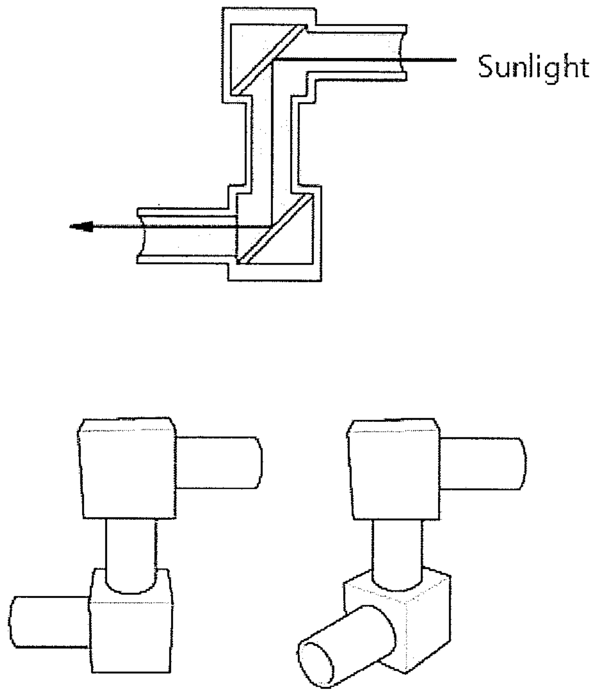
FIG. 14 is a view of the light transmission member in a coupled state.

FIG. 12 is a perspective view of a light transmission member according to one exemplary embodiment, FIG. 13 is a cross-sectional view of the light transmission member, and FIG. 14 is a view of the light transmission member in a coupled state.

In FIG. 12 to FIG. 14, the light transmission member according to this embodiment may include a transmission unit 510 and a course changing unit 520.

The transmission unit 510 may include a cover 511 serving as an outer shell, a reflective coating 512 formed on an inner surface of the cover and subjected to mirror finishing, and a hollow transmitting portion 513 which is formed inside the reflective coating and to which sunlight is transmitted.

The course changing unit 520 may include a coupling portion 521 to which the transmission unit is coupled, and a course changing portion 522 for changing the course of sunlight.

Here, the coupling portion may be coupled to the transmission unit via screw coupling, socket coupling or the like, and the course changing portion may be realized by a prism or a mirror The transmission unit and the course changing unit may be detachably attached to each other so as to be arbitrarily combined with each other in a block shape according to the course of sunlight, and an angle therebetween may be freely adjusted according to the orientation of the transmission unit after coupling, as shown in FIG. 13.

Figure 15:
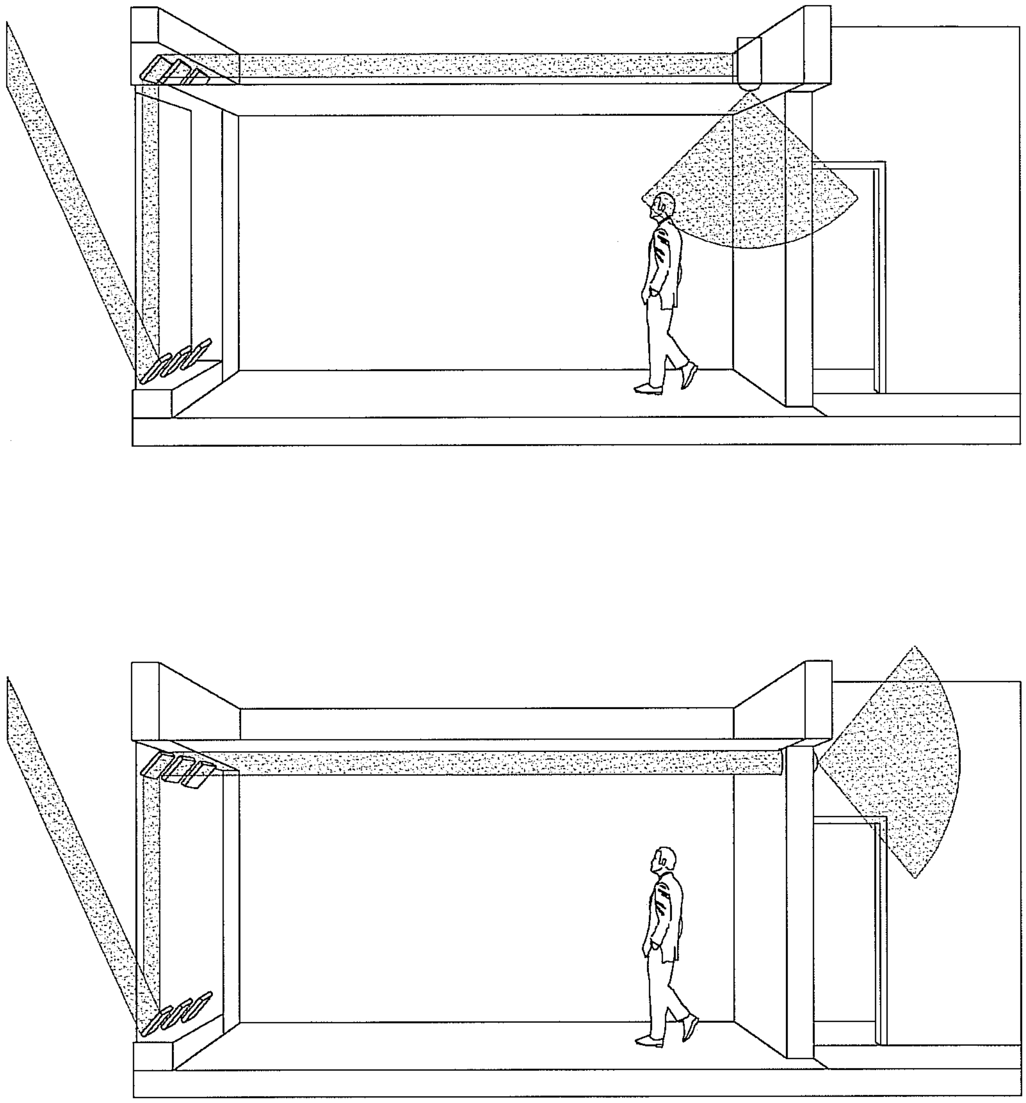
FIG. 15 is a view of the natural lighting apparatus according to the exemplary embodiment of the present invention, which is installed on an elevated side of a building.

FIG. 15 is a view of the natural lighting apparatus according to the exemplary embodiment, which is installed on an elevated side of a building.

As can be seen from FIG. 15, sunlight converted into straight parallel light rays of a high luminous flux through the natural lighting system may be supplied into a room including an indoor space or an underground space to which direct transmission is difficult.

Next, a hybrid illumination system employing a natural lighting apparatus according to one exemplary embodiment of the invention will be described.

Figure 16:
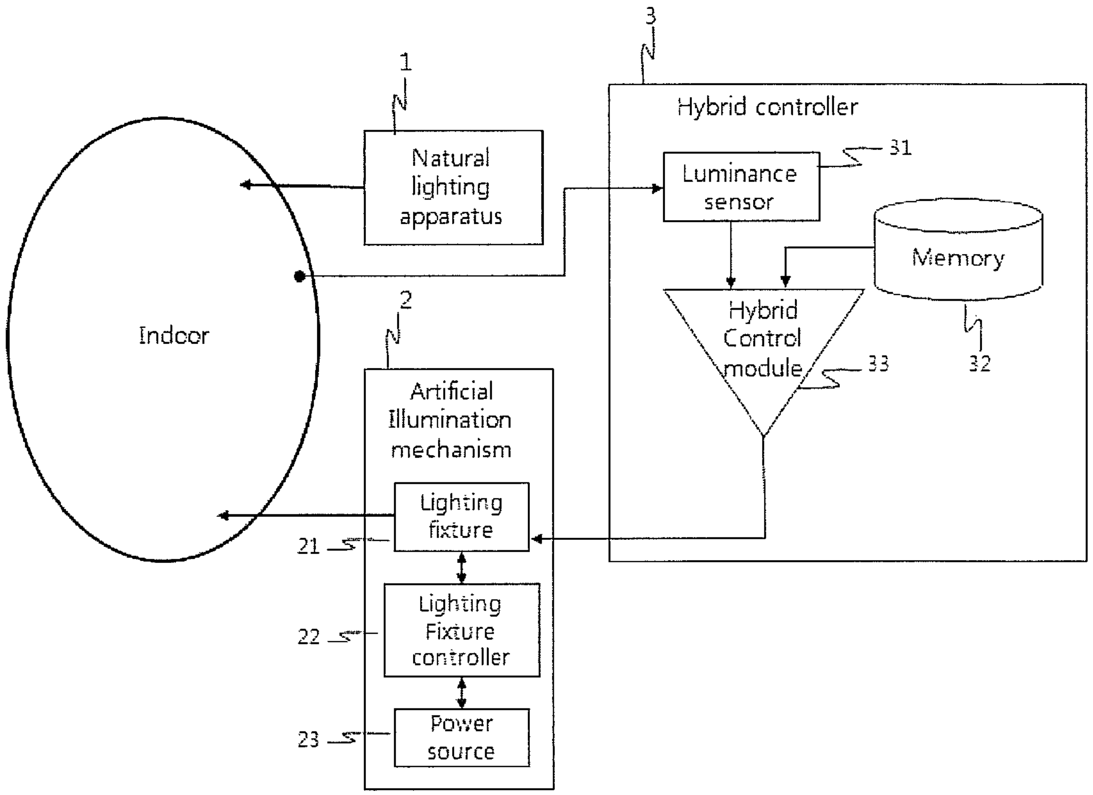
FIG. 16 is a configuration view of a hybrid illumination system according to one exemplary embodiment of the present invention.

FIG. 16 is a configuration view of a hybrid illumination system according to one embodiment of the present invention.

Referring to FIG. 16, the hybrid illumination system according to the embodiment of the invention may include a natural lighting apparatus 1, an artificial illumination mechanism 2, and a hybrid controller 3 which controls natural illumination of the natural lighting apparatus and artificial illumination of the artificial illumination mechanism in a hybrid manner.

Here, the natural lighting apparatus 1 is the same as that described in detail with reference to the aforementioned embodiment, and thus a detailed description thereof will be omitted herein.

The artificial illumination mechanism 2 may include a lighting fixture 21 to supply artificial illumination, a lighting fixture controller 22 controlling operation of the lighting fixture, and a power source 23 supplying power to the lighting fixture The power source 23 may be implemented by a commercial power source or a solar power generator for generating power using sunlight.

When the power source 23 is realized by the solar power generator, the power source may include a solar cell module installed on the roof of a building to accumulate thermal energy, and a converter converting the thermal energy accumulated in the solar cell module into electric energy.

Further, the hybrid controller 3 may include a luminance sensor 31 which measures luminance (that is, intensity of light) of sunlight supplied through the natural lighting apparatus, a hybrid control module 33 which controls operation of the artificial illumination mechanism according to the luminance measured from the luminance sensor, and a memory 32 which stores luminance data for operation of the artificial illumination mechanism.

More specifically, the memory 32 stores a minimum reference luminance Emin and a maximum reference luminance Emax for operation of the artificial illumination mechanism. When the intensity of light measured by the luminance sensor 31 is greater than the minimum reference luminance Emin, natural lighting through the natural lighting apparatus 1 is used without using the artificial illumination mechanism, and when the measured luminance is less than or equal to the minimum reference luminance, the hybrid controller 3 operates the artificial illumination mechanism 2.

When the luminance is greater than the maximum reference luminance Emax after operation of the artificial illumination mechanism 2, the artificial illumination mechanism 2 is turned off or is operated to provide low luminance, and indoor luminance is maintained only through the natural lighting apparatus. Herein, the term minimum reference luminance Emin is defined as the maximum luminance which does not require artificial illumination, and the term maximum reference luminance Emax is defined as the minimum luminance which requires luminance reduction due to undesirably high luminance after operation of the artificial illumination.

The minimum reference luminance Emin and the maximum reference luminance Emax may be set or changed according to the purpose of buildings or time.

Thus, the hybrid illumination system is operated such that the indoor luminance can be maintained between the minimum reference luminance Emin and the maximum reference luminance Emax.

Therefore, the hybrid illumination system according to the embodiment employs the natural lighting apparatus together with the artificial illumination mechanism and allows the artificial illumination mechanism to be operated as needed, thereby minimizing energy consumption.

Further, when the measured luminance is lower than or equal to the reference luminance stored in the memory 32, the hybrid controller may set operation of the lighting fixture 21 according to each luminance level and may allow only the artificial luminance mechanism to operate in order to supply a minimum amount of light needed for the reference luminance.

Figure 17:
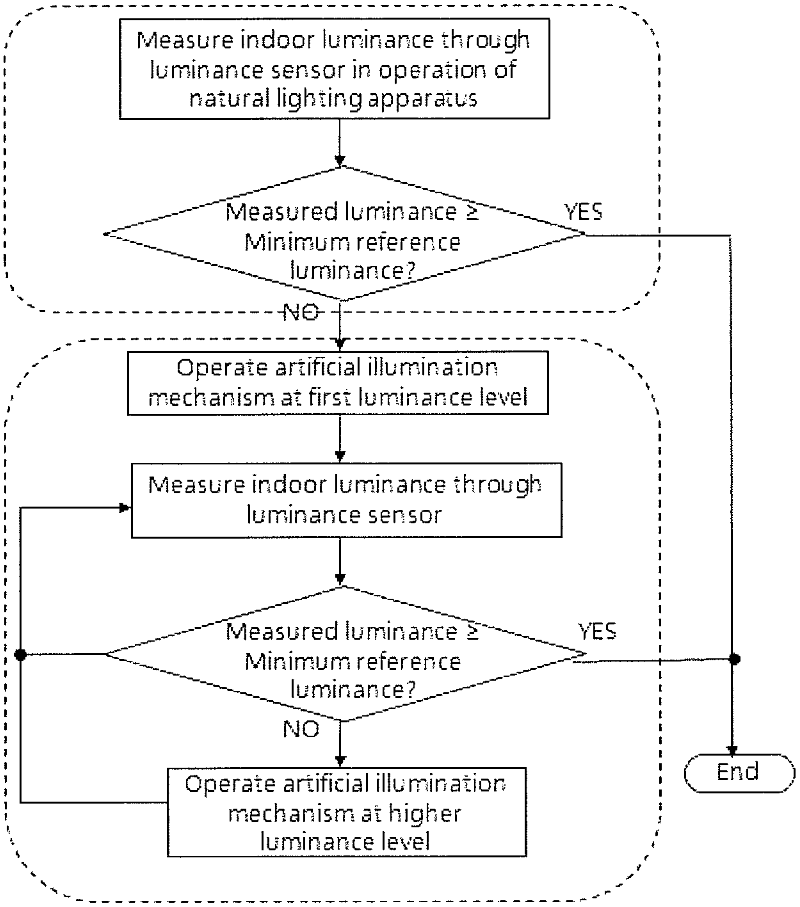
Figure 18:
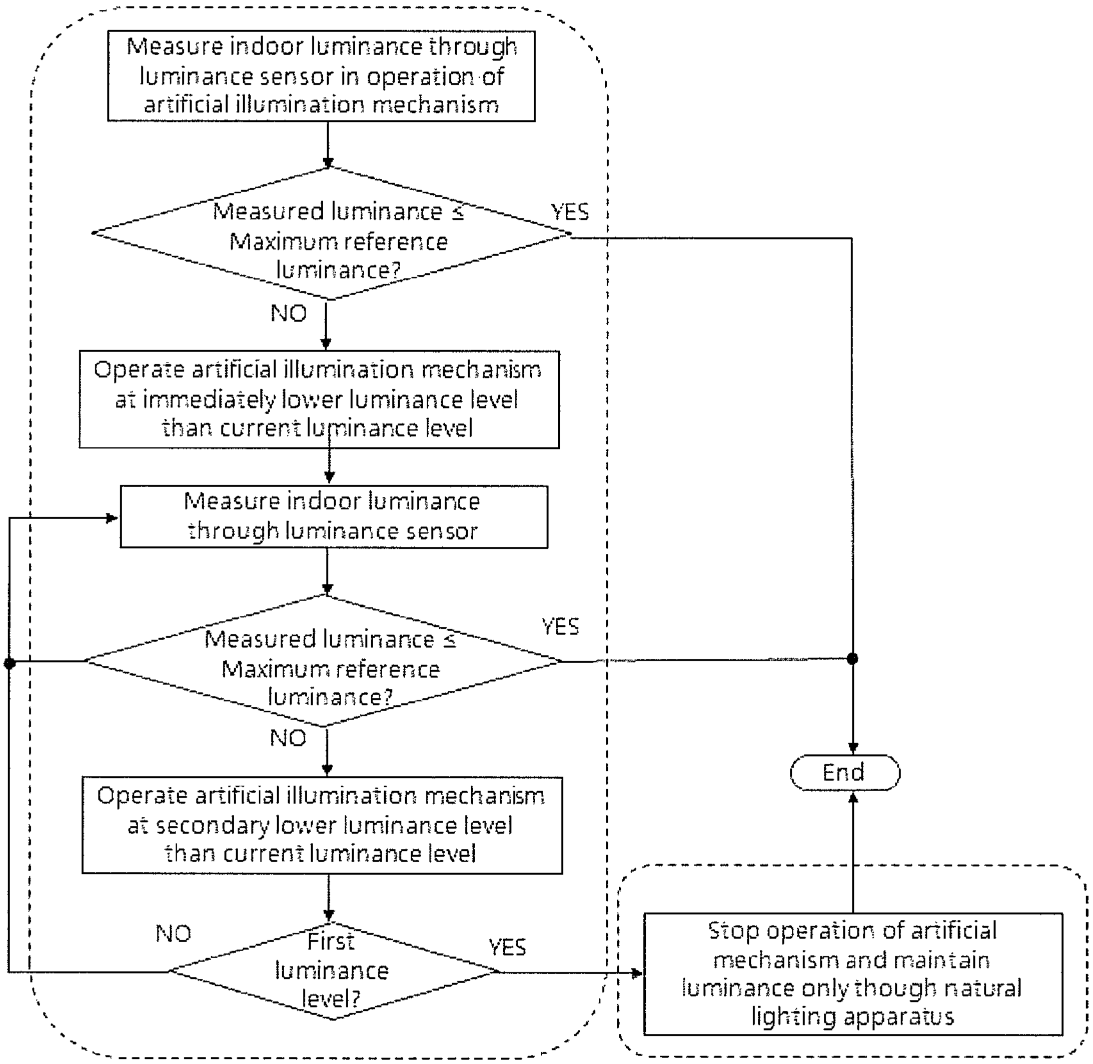

FIG. 17 and FIG. 18 are flowcharts of a process of controlling the artificial illumination mechanism through the hybrid control module according to one exemplary embodiment, in which FIG. 17 is a flowchart of a process of controlling the artificial illumination mechanism when an indoor luminance is less than or equal to a minimum reference luminance, and FIG. 18 is a flowchart of a process of controlling the artificial illumination mechanism when an indoor luminance is greater than or equal to a maximum reference luminance.

Referring to FIG. 17, the hybrid control module 33 determines whether artificial illumination is needed since a luminance measured by the luminance sensor is lower than the minimum reference luminance Emin.

When artificial illumination is required, the hybrid control module 33 operates the artificial illumination mechanism at a minimum luminance level. Here, the luminance level may be increased stepwise through the number of lighting lamps turned on in the lighting fixture or through dimming control.

Then, the hybrid controller controls the luminance sensor 31 to measure the luminance and determines whether the measured luminance is greater than or equal to the minimum reference luminance Emin. If the measured luminance is greater than the minimum reference luminance Emin, the current luminance level is maintained, and if the measured luminance is less than or equal to the minimum reference luminance Emin, the artificial illumination mechanism is operated at a subsequent luminance level.

The indoor luminance may be maintained at a constant level by repeating the process as mentioned above until the current luminance reaches the minimum reference luminance Emin or more.

Referring to FIG. 18, the hybrid control module 33 determines that the current luminance measured by the luminance sensor exceeds the maximum reference luminance Emax, with the artificial illumination mechanism operated.

If the current luminance exceeds the maximum reference luminance Emax, the artificial illumination mechanism is operated at a subsequently lower luminance level than the current luminance level in order to lower the indoor luminance. If the current luminance does not exceed the maximum reference luminance Emax, the current luminance is maintained.

Then, if the luminance is greater than the maximum reference luminance Emax after operation of the artificial illumination mechanism 2 at the subsequently lower luminance level, the process of operating the artificial illumination mechanism at a secondary lower luminance level is repeated.

If a luminance measured at a first luminance level, which is the lowest luminance level, exceeds the maximum reference luminance Emax, the operation of the artificial illumination mechanism is stopped, and the indoor luminance is then maintained only through the natural lighting apparatus.

Although some embodiments have been described herein, it should be understood by those skilled in the art that these embodiments are given by way of illustration only, and that various modifications, variations, and alterations can be made without departing from the spirit and scope of the invention. Therefore, the scope of the invention should be limited only by the accompanying claims and equivalents thereof.

The invention claimed is:

1. A hybrid illumination system, comprising:

a natural lighting apparatus, comprising:

a first light condensing member comprising a concave mirror having a parabolic shape and reflecting incident sunlight to a focal region; and a second light condensing member comprising a convex mirror having a parabolic shape and provided in the focal region of the first light condensing member to convert sunlight condensed in the focal region through the first light condensing member into straight parallel light rays;

an artificial illumination mechanism supplying artificial illumination via a lighting fixture; and a hybrid controller controlling natural illumination provided by the natural lighting apparatus and artificial illumination provided by the artificial illumination mechanism, the hybrid controller comprising:

a luminance sensor measuring indoor luminance;

a memory storing a minimum reference luminance for optimal luminance; and a hybrid control module controlling the artificial illumination mechanism to operate when a luminance measured by the luminance sensor is lower than the minimum reference luminance stored in the memory, wherein, when the luminance measured by the luminance sensor is lower than the minimum reference luminance stored in the memory, the hybrid control module sets operation of the lighting fixture based on each luminance level measured by the luminance sensor, and repeats a process of operating the lighting fixture by increasing stepwise a luminance level at which the lighting fixture is operated, from a lowest luminance level to a higher luminance level, until a measured luminance level is greater than or equal to the minimum reference luminance.

2. The system of claim 1, wherein the natural lighting apparatus further comprises a light transmission member transmitting the straight parallel light rays converted from sunlight through the second light condensing member, comprising:

a transmission unit transmitting the sunlight; and a course changing unit coupled to the transmission unit, the course changing unit including a prism or a mirror changing a course of the sunlight received from the transmission unit.

3. The system of claim 2, wherein the transmission unit comprises:

a hollow transmitting portion that receives sunlight from the second light condensing member;

a cover surrounding the hollow transmitting portion; and a reflective coating formed on an inner surface of the cover, between the cover and the hollow transmitting portion.

4. The system of claim 2, wherein the natural lighting apparatus further comprises:

a reflection member vertically or horizontally separated from the first light condensing member and reflecting sunlight to be vertically or horizontally incident on the first light condensing member; and a heat sink provided at a back side of the second light condensing member.

* * * * *